US011125306B2

(12) United States Patent
Furuya et al.

(10) Patent No.: US 11,125,306 B2
(45) Date of Patent: Sep. 21, 2021

(54) DIVIDING WALL FOR PRIMARY PULLEY IN BELT-TYPE CONTINUOUSLY VARIABLE TRANSMISSION

(71) Applicant: UNIPRES CORPORATION, Yokohama (JP)

(72) Inventors: Nobuhiko Furuya, Shizuoka (JP); Masamichi Miwa, Shizuoka (JP); Toshiyuki Ichikawa, Shizuoka (JP); Katsuyo Fukumoto, Shizuoka (JP); Yosuke Sugisawa, Shizuoka (JP); Tsutomu Kaji, Shizuoka (JP)

(73) Assignee: UNIPRES CORPORATION, Yokohama (JP)

( * ) Notice: Subject to any disclaimer, the term of this patent is extended or adjusted under 35 U.S.C. 154(b) by 316 days.

(21) Appl. No.: 16/465,408

(22) PCT Filed: Feb. 8, 2018

(86) PCT No.: PCT/JP2018/004348
§ 371 (c)(1),
(2) Date: May 30, 2019

(87) PCT Pub. No.: WO2018/151000
PCT Pub. Date: Aug. 23, 2018

(65) Prior Publication Data
US 2019/0346026 A1    Nov. 14, 2019

(30) Foreign Application Priority Data
Feb. 20, 2017  (JP) .............................. JP2017-028840

(51) Int. Cl.
*F16H 9/14* (2006.01)
*F16H 55/49* (2006.01)
*F16H 55/56* (2006.01)

(52) U.S. Cl.
CPC ............... *F16H 9/14* (2013.01); *F16H 55/49* (2013.01); *F16H 55/56* (2013.01)

(58) Field of Classification Search
CPC .... F16H 63/065; F16H 9/18; F16H 61/66263; F16H 55/56
(Continued)

(56) References Cited

U.S. PATENT DOCUMENTS 3,596,528 A * 8/1971 Dittrich ............. F16H 61/66263
474/12
3,600,961 A * 8/1971 Rattunde ........... F16H 61/66263
477/46
(Continued)

FOREIGN PATENT DOCUMENTS

| JP | 2005-533227 A | 11/2005 |
| JP | 2014-185702 A | 10/2014 |

(Continued)

OTHER PUBLICATIONS

International Search Report with English translation and Written Opinion issued in corresponding application No. PCT/JP2018/004348 dated Mar. 27, 2018.

*Primary Examiner* — Henry Y Liu
(74) *Attorney, Agent, or Firm* — Foley & Lardner LLP (57) ABSTRACT

The present invention relates to relates to an improvement of a dividing wall for a primary pulley in a belt-type continuously variable transmission. It is an object of the present invention to obtain a desired strength characteristic without performing a soft nitriding treatment and achieve cost reduction. A hydraulic pressure chamber is formed between the dividing wall and the movable sheave, and the dividing wall comprises a small-diameter annular disc portion 32 extended from the central cylinder portion 30, which is attached to a rotational shaft, in a radial direction. In the small-diameter annular disc portion 32, a connecting portion which is
(Continued)

connected to an intermediate body portion 34 is a bent portion 38 which is bent at substantially 90 [deg]. In a cross-section of an inner peripheral surface of the bent portion 38, the inner peripheral surface of the bent portion 38 is constituted by an inner radius side arc 40-1 whose origin position is $O_1$ and curvature radius is $R_1$, an outer radius side arc 40-2 whose origin position is $O_2$, which is a different position from the origin position $O_1$ of the inner radius side arc 40-1, and curvature radius is $R_2$, which is a different value from the curvature radius $R_1$ of the inner radius side arc 40-1, and an intermediate portion 40-3 that the inner radius side arc 40-1 is smoothly connected to the outer radius side arc 40-2. By adopting the above shape, when a load is applied to the dividing wall, a stress value at a concave surface 40 can be reduced, and desired durability can be obtained without performing the soft nitriding treatment and achieve cost reduction.

8 Claims, 9 Drawing Sheets (58) Field of Classification Search
USPC .......................................................... 474/28
See application file for complete search history.

(56) References Cited

U.S. PATENT DOCUMENTS

| | | | | |
|---|---|---|---|---|
| 3,782,213 A * | 1/1974 | Rattunde | F16H 55/56 | 474/28 |
| 4,023,425 A * | 5/1977 | Parker | F16H 55/56 | 474/16 |
| 4,056,015 A * | 11/1977 | Ludoph | F16H 9/16 | 474/28 |
| 4,143,558 A * | 3/1979 | Van Deursen | F16H 63/065 | 474/28 |
| 4,229,988 A * | 10/1980 | Rattunde | F16H 9/18 | 474/28 |
| 4,348,197 A * | 9/1982 | Oliver | F16H 61/6625 | 474/17 |
| 4,350,491 A * | 9/1982 | Steuer | F16H 63/065 | 474/12 |
| 4,365,964 A * | 12/1982 | Krome, Jr. | F16H 55/56 | 474/28 |
| 4,639,238 A * | 1/1987 | Jaccod | F16H 55/56 | 474/28 |
| 5,013,283 A * | 5/1991 | d'Herripon | F16H 9/125 | 474/12 |
| 5,180,339 A * | 1/1993 | Haley | F16H 55/56 | 474/28 |
| 5,221,235 A * | 6/1993 | Ogawa | F16H 55/56 | 474/25 |
| 5,244,437 A * | 9/1993 | Haley | F16H 55/56 | 474/18 |
| 5,269,726 A * | 12/1993 | Swanson | F16H 55/56 | 474/28 |
| 5,342,247 A * | 8/1994 | Adriaenssens | F16H 61/66272 | 474/16 |
| 5,439,419 A * | 8/1995 | Yamada | F16H 55/56 | 474/18 |
| 5,628,700 A * | 5/1997 | Yamada | F16H 55/56 | 474/18 |
| 5,676,612 A * | 10/1997 | Schellekens | F16H 55/56 | 474/18 |
| 5,776,022 A * | 7/1998 | Schellekens | F16H 63/065 | 474/18 |
| 5,803,846 A * | 9/1998 | Yamada | F16H 55/56 | 474/18 |
| 6,152,843 A * | 11/2000 | Murakami | F16H 55/56 | 474/28 |
| 6,174,253 B1 * | 1/2001 | Walter | F16H 9/18 | 474/18 |
| 6,190,274 B1 * | 2/2001 | Walter | F16H 9/06 | 474/28 |
| 6,234,925 B1 * | 5/2001 | Walter | F16H 63/065 | 267/180 |
| 6,280,357 B1 * | 8/2001 | Van Spijk | F16H 61/66272 | 474/16 |
| 6,336,878 B1 * | 1/2002 | Ehrlich | F16H 55/56 | 474/18 |
| 6,361,456 B1 * | 3/2002 | Walter | F16H 55/56 | 474/18 |
| 6,361,470 B1 * | 3/2002 | Friedmann | F16H 55/56 | 474/28 |
| 6,846,255 B2 * | 1/2005 | Muller | F16H 55/56 | 474/18 |
| 6,962,542 B2 * | 11/2005 | Van Spijk | F16H 55/56 | 474/18 |
| 6,997,834 B2 * | 2/2006 | Vorndran | F16H 55/56 | 474/18 |
| 7,048,657 B2 * | 5/2006 | Faust | F16H 55/56 | 474/18 |
| 7,264,564 B2 * | 9/2007 | Walter | F16H 55/56 | 474/18 |
| 7,575,528 B2 * | 8/2009 | Plath | F16H 55/56 | 474/28 |
| 7,686,715 B2 * | 3/2010 | Carlson | F16H 63/065 | 474/28 |
| 7,753,814 B2 * | 7/2010 | Nozawa | F16H 63/065 | 474/28 |
| 7,762,915 B2 * | 7/2010 | Kouta | F16H 63/065 | 474/18 |
| 7,771,301 B2 * | 8/2010 | Kauffeldt | F16H 55/56 | 474/28 |
| 7,811,187 B2 * | 10/2010 | Koyama | F16H 61/66272 | 474/28 |
| 8,029,395 B2 * | 10/2011 | Hokari | F16H 63/065 | 474/28 |
| 8,052,555 B2 * | 11/2011 | Muller | F16H 59/16 | 474/18 |
| 8,100,791 B2 * | 1/2012 | Yamaguchi | F16H 63/065 | 474/28 |
| 8,147,364 B2 * | 4/2012 | Shioiri | F16H 61/66272 | 474/28 |
| 8,414,433 B2 * | 4/2013 | Kadokawa | F16H 9/18 | 474/28 |
| 8,562,463 B2 * | 10/2013 | Shioiri | F16H 61/66263 | 474/28 |
| 8,864,610 B2 * | 10/2014 | Kadokawa | F16H 9/18 | 474/8 |
| 9,017,193 B2 * | 4/2015 | Kadokawa | F16H 55/56 | 474/8 |
| 2005/0192132 A1 | 9/2005 | Faust | | |
| 2017/0152924 A1 | 6/2017 | Tsuji | | |

FOREIGN PATENT DOCUMENTS

| | | |
|---|---|---|
| JP | 2015-183753 A | 10/2015 |
| JP | 2017-15116 A | 1/2017 |
| WO | WO-2015/146616 A1 | 10/2015 |

* cited by examiner

DIVIDING WALL FOR PRIMARY PULLEY IN BELT-TYPE CONTINUOUSLY VARIABLE TRANSMISSION

TECHNICAL FIELD

The present invention relates to an improvement about a dividing wall for a primary pulley in a belt-type continuously variable transmission.

BACKGROUND ART

It is well known that a method of realizing continuous velocity change operation by using a belt-type continuously variable transmission in a vehicle that comprises a primary pulley of an output shaft side of an engine comprising a width-variable belt groove having a V-shape cross-section and a secondary pulley of a wheel shaft side comprising a width-variable belt groove having a V-shape cross-section, winds a V-belt between the primary pulley and the secondary pulley, and continuously changes a contact position of the belt to the primary pulley and the secondary pulley by hydraulic pressure. In the primary pulley of the belt-type continuously variable transmission which adopts such a transmission method, it is known that the primary pulley that comprises a fixed sheave coupled to a crank shaft of the engine through a torque converter, a movable sheave that forms the width-variable belt groove having the V-shape cross-section for the driving belt to an opposite surface of the fixed sheave and slidably moves on a rotational shaft, which is coupled to the fixed sheave and integrally rotates the fixed sheave, in the axial direction, a dividing wall that maintains oil-tightness when the movable sheave moves to the spacing side against the fixed sheave and can relatively move to the movable sheave, and a hydraulic pressure chamber formed between the dividing wall and the movable sheave (Patent Document 1). The dividing wall has a tubular cylindrical shape as a whole whose radius becomes larger toward the movable sheave for forming the hydraulic pressure chamber, and comprises a rotational shaft attachment portion to attach to the rotational shaft, a movable sheave abutment portion to slightly and outwardly extend in a radial direction to the rotational shaft attachment portion and form an opposite abutment surface to the movable sheave, a axial direction extending portion to extend from the movable sheave abutment portion to the axial direction so that the movable sheave can move to the fixed sheave in the axial direction, and a movable sheave slidable moving portion to maintain the oil-tightness to the movable sheave at the proximal end of the movable sheave of the axial direction extending portion, slidably move in the axial direction, and engage with the movable sheave. The movable sheave abutment portion comprises a bent portion that is roundly bent at a substantially 90 [deg] in an outward portion of the radial direction and is connected to the axial direction extending portion.

The dividing wall can be a press molded article made from sheet steel from a viewpoint of cost reduction. However, a high hydraulic pressure applies to the dividing wall in the hydraulic pressure chamber. The high hydraulic pressure applies to the dividing wall frequently and repeatedly to control the width of the V-belt groove to vary the velocity. Thus, the dividing wall must be strong enough to endure the high hydraulic pressure which applies frequently and repeatedly for a long term use. Considering that the dividing wall can be manufactured by the press working, thickness of the sheet steel will be 6 mm in general. In a case that the dividing wall is the press molded article, the local weak-strength portion can be occurred due to limiting of the thickness of the sheet steel. Therefore, it is common general technical knowledge that it is necessary to adopt adequate countermeasures against the concern about the loss of strength due to fatigue by a long term use. In the structure of the dividing wall of Patent Document 1, the connecting portion to the axial direction extending portion in the movable sheave abutment has a steeply bent portion at a substantially 90 [deg] angle. Especially, it is important to take countermeasures against an increase in the local load due to the stress concentration in an inner peripheral surface side. In the technology of Patent Document 1, the inner peripheral of the bent portion which is the connecting portion between a first annular disc and a cylindrical intermediate portion is formed in a concave surface. Although the explanation of the function of the concave surface is not existed in the description of Patent Document 1, it is considered that the concave surface is the countermeasure against the stress concentration.

THE LIST OF PRIOR ART DOCUMENTS

Patent Documents

Patent Document 1: Japanese Unexamined Patent Publication No. 2014-185702 A

SUMMARY OF THE INVENTION

Problems to be Solved by the Invention

It is well known that the inner peripheral surface in the bent portion is formed in the concave surface for the relaxation of the stress concentration. It is well performed technology that the press molded article is cut-worked to the concave surface having a predetermined radius by a lathe (so-called "Round processing"). However, as a result of consideration of the applicant, in a case of the dividing wall of the primary pulley of the belt-type continuously variable transmission, behaviors of the stress concentration of the respective portions due to the repeated loads are complicated. The concave surface processing having a single curvature radius which is the conventional common general technical knowledge is used to prevent the stress concentration. However, the above concave surface processing is difficult to realize the performance level of the user requirement for the stress concentration. After the cutting process, soft nitriding treatment is performed for enhancing the function of preventing stress concentration. It is well known that the soft nitriding treatment is a surface hardening technology that nitride is formed on the surface of the steel by heating in an ammonia gas atmosphere. By combined-using the soft nitriding treatment, occurrence of a crack and the like due to the stress concentration can effectively be prevented. However, the soft nitriding treatment is the factors of increases in the process cost and the equipment cost. It is an object of the present invention to obtain a desired strength characteristic without applying the soft nitriding and achieve cost reduction.

Means for Solving the Problems

The present invention relates to a dividing wall for a primary pulley in a belt-type continuously variable transmission that comprises a rotational shaft, a fixed sheave to integrally rotate the rotational shaft, a movable sheave to integrally rotate the rotational shaft, move to the fixed sheave in a axial direction and vary a distance to the fixed sheave depending on hydraulic pressure, a hydraulic pressure chamber formed to an spacing side of the fixed sheave in the movable sheave, and a dividing wall that has a tubular cylindrical shape as a whole for forming the hydraulic pressure chamber, integrally rotates the rotational shaft, maintains oil-tightness to the movable sheave and slidably moves in the axial direction, the above-described object of the present invention is achieved by that: wherein the dividing wall is manufactured by press-molding to sheet steel having a predetermined thickness and performing a finish cutting machining process, and comprises a rotational shaft attachment portion to attach to the rotational shaft, a movable sheave abutment portion to slightly and outwardly extend in a radial direction to the rotational shaft attachment portion and form an opposite abutment surface to the movable sheave, an extending portion to extend from the movable sheave abutment portion to the axial direction so that the movable sheave moves to the fixed sheave in the axial direction, and a movable sheave slidable moving portion to maintain oil-tightness to the movable sheave at the proximal end of the movable sheave of the extending portion, slidably move in the axial direction, and engage with the movable sheave, wherein the movable sheave abutment portion comprises a bent portion to be bent for and be connected to the extending portion, and wherein a cross-section of an inner peripheral concave surface of the bent portion comprises at least two arcs that have a different origin position and a different curvature radius, and at least one connecting portion where the at least two arcs are smoothly connected. Here, "smoothly connected" means a connection in which the steep convex and the steep concave by which the stress concentration is generated are not included. It is preferred that the arc be connected tangent to the adjacent arc or the tangential line of the arc be connected to that of the adjacent arc. In the present invention, the soft nitriding treatment is not performed after performing the finish cutting machining process. Moreover, the arc includes not only a geometrical arc but also the shape that is a substantially geometrical arc.

Effects of the Invention

According to the present invention, the cross-sectional concave shape in the inner peripheral surface of the bent portion which is the connecting portion to the extending portion of the movable sheave abutment portion in the dividing wall has a shape that is connected with the at least two arcs having a different curvature radius and a different origin position. By adopting the above shape, when the load is applied to the dividing wall, the stress value at the concave surface can be reduced (the relaxation of the stress concentration). As shown in a virtual test result by a finite element method described below, the durability under the repeated load is remarkably improved and then the soft nitriding treatment which is the essential process for obtaining the desired durability in the concave surface having a single radius, can be omitted. This simple countermeasure can achieve the remarkable effect. However, the theoretical grounds are not necessarily clear. The generation mechanism of the stress concentration in the inner peripheral surface of the bent portion, which is bent at substantially 90 [deg] and is the connecting portion to the axial direction extending portion of the movable sheave abutment portion in the dividing wall, is considerably complicate, and the generation points of the stress concentration are not one point but are distributed at the plural points. Thus, it can be estimated that the optimum values of the curvature radii of the cross-section at the respective stress generation points do not necessarily have the same value but have the corresponding values. Thereby, the remarkable stress concentration reduction effect is achieved, the soft nitriding treatment which is the essential reinforcement process after the finish cutting machining process in conventional can be omitted, and the considerable cost reduction in the dividing wall for the primary pulley in the belt-type continuously variable transmission can be realized.

MODE FOR CARRYING OUT THE INVENTION

Figure 1:
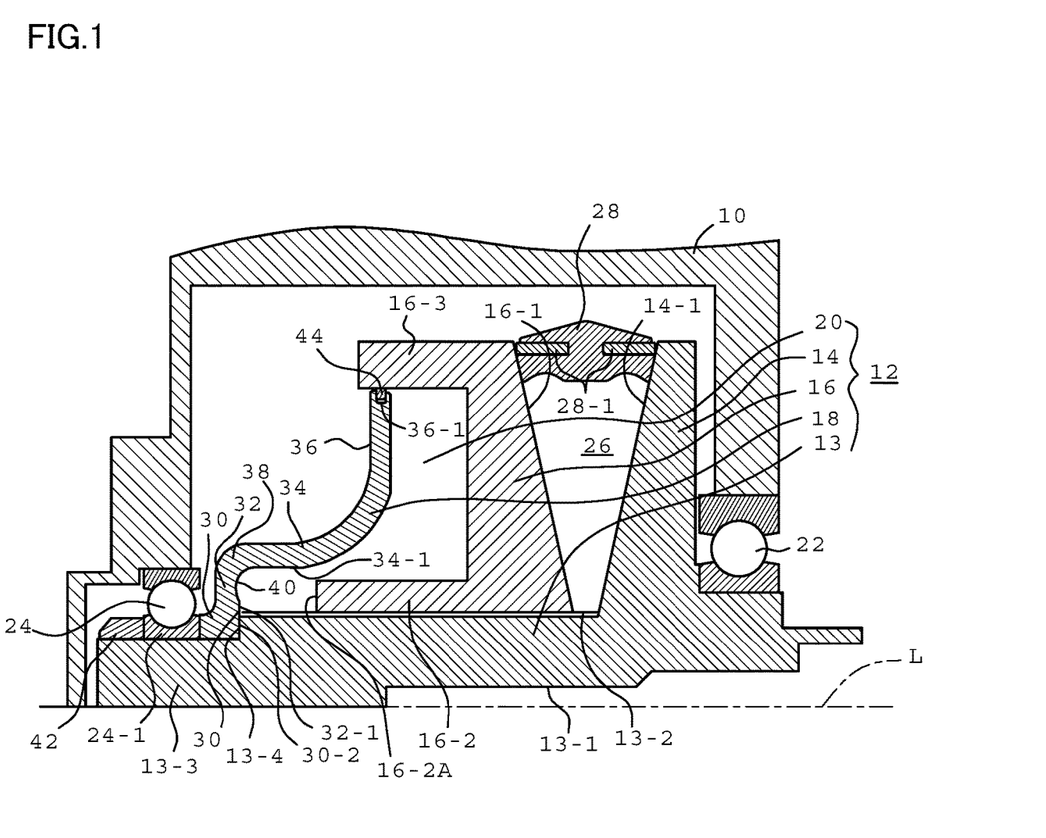
FIG. 1 is a schematic cross-sectional view of a primary pulley of the present invention.

FIG. 1 is a schematic cross-sectional view of a primary pulley in a belt-type continuously variable transmission according to the present invention. Basically, a configuration of the belt-type continuously variable transmission is similar to that of Patent Document 1 (Japanese Unexamined Patent Publication No. 2014-185702 A). A housing 10 that receives the overall belt-type continuously variable transmission is schematically shown in FIG. 1. The primary pulley 12 of the belt-type continuously variable transmission and a secondary pulley (not shown) are enclosed in the housing 10. The primary pulley 12 comprises a rotational shaft 13, a fixed sheave 14, a movable sheave 16, a dividing wall 18 and a hydraulic pressure chamber 20 formed between the movable sheave 16 and the dividing wall 18. Means such as a passage for introducing operation oil into the hydraulic pressure chamber 20 are disposed. However, since the above means themselves are well known and the above means are hardly related to the main object of the present invention, the above means are not shown and the explanation of the above means is omitted. The rotational shaft 13 is coupled to or is integrally formed to the fixed sheave 14 so as to integrally rotate with the fixed sheave 14. Roller bearings 22 and 24 are disposed at both ends of the rotational shaft 13 and rotatably support the rotational shaft 13 around a center line "L" to the housing 10. An inner peripheral surface 14-1 having a slope is formed on the fixed sheave 14. An inner peripheral surface 16-1 which is opposed to the inner peripheral surface 14-1 and has a slope whose gradient direction is opposite to that of the inner peripheral surface 14-1, is formed on the movable sheave 16. A belt groove 26 having a V-shape cross-section is formed between the inner peripheral surfaces 14-1 and 16-1. A V-belt 28 is wound between the belt groove 26 and a similar belt groove (not shown) having a V-shape cross-section on the secondary pulley. Core metal sheets 28-1 which reinforces an interior of the V-belt 28 are schematically shown in FIG. 1. It is well known that continuous velocity change operation is realized by continuously varying contact positions of the V-belt 28 to the primary pulley 12 and the secondary pulley by the hydraulic pressure. For simplification, the movable sheave 16 is shown by a schematic structure, and comprises a central cylinder extending portion 16-2 and an outer peripheral cylinder extending portion 16-3 which are extended to a spacing side to the fixed sheave 14.

The detail structure of the primary pulley 12 will be further described. The rotational shaft 13 forms an input shaft connection bore 13-1. A spline is formed on an inner peripheral surface of the input shaft connection bore 13-1. The rotational shaft 13 spline-fits with an input shaft (not shown) extending from an engine crank shaft side through mostly a fluid-type torque converter, and transmits the rotation of the engine to the primary pulley 12. A spline is formed on an outer peripheral surface of the rotational shaft 13. The movable sheave 16 comprises a central cylinder extending portion 16-2. A spline is formed on an inner peripheral surface of the central cylinder extending portion 16-2. By the spline-fitting, the movable sheave 16 integrally rotates with the rotational shaft 13, that is, the fixed sheave 14. Accordingly, the movable sheave 16 can move along the axial direction on the rotational shaft 13 and then a groove width of the belt groove 26 having a V-shape can desirably be varied.

Figure 2:
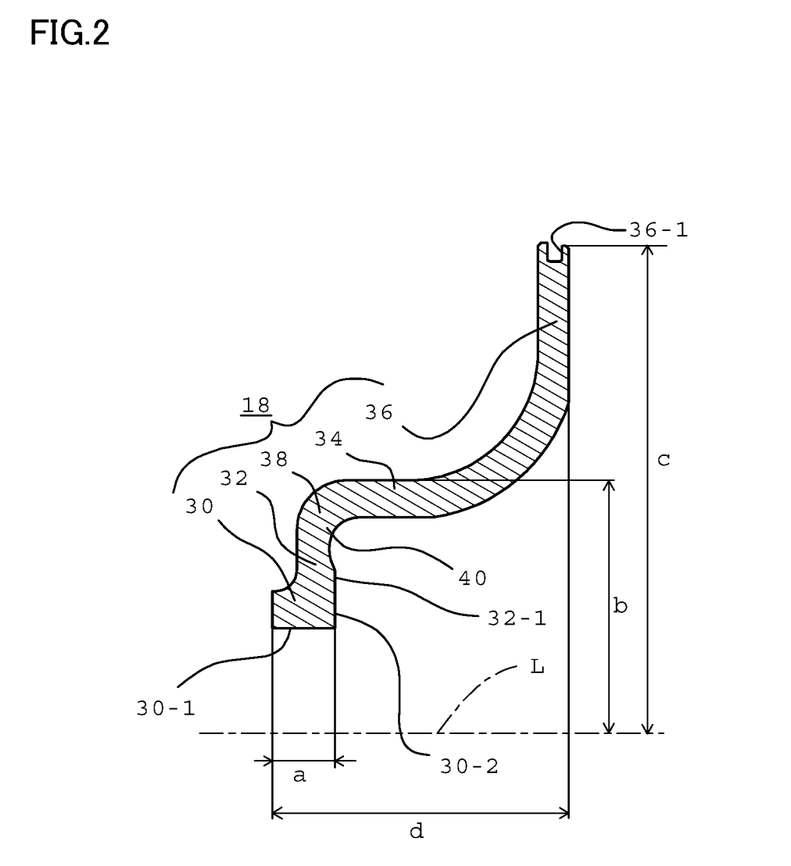
FIG. 2 is a cross-sectional views showing a dividing wall.

The dividing wall 18 will be described. The dividing wall 18 is a press molded article made from sheet steel having about 6 mm thickness, and has a tubular cylindrical shape as a whole whose radius becomes larger toward the movable sheave for forming a cavity portion which can receive the movable sheave 16 moving along the axial direction. As shown in FIG. 2 which depicts only the dividing wall 18, the dividing wall 18 comprises a central cylinder portion 30 (a rotational shaft attachment portion in the present invention) for attaching the movable sheave to the rotational shaft 13, a small-diameter annular disc portion 32 (a movable sheave abutment portion in the present invention) extended from the central cylinder portion 30 in a radial direction, an intermediate body portion 34 (an extending portion in the present invention) which is connected to the outer peripheral portion of the small-diameter annular disc portion 32, is extended toward the movable sheave in the axial direction, and becomes a lager-diameter with a round on the inner and the outer peripheral surfaces toward the movable sheave 16 at a proximal end to the movable sheave 16, and a large-diameter annular disc portion 36 (a movable sheave slidable moving portion in the present invention) which is smoothly connected to a movable sheave 16 side end of the intermediate body portion 34, maintains oil-tightness to the movable sheave on an outer peripheral surface, slidably moves in the axial direction, and engages with the movable sheave. The small-diameter annular disc portion 32 comprises a bent portion 38 which is roundly bent at a substantially 90 [deg] in an outward portion of the radial direction, and is connected to the intermediate body portion 34 through the bent portion 38. An inner peripheral concave surface 40 of the bent portion 38 of the small-diameter annular disc portion 32 has a below-described cross-sectional shape in detail. Stress concentration generated on the dividing wall 18 by hydraulic pressure control of a hydraulic pressure chamber 20 when performing velocity change operation in the continuously variable transmission is effectively suppressed by the shape of the inner peripheral concave surface 40 of the bent portion 38 in the present invention. The central cylinder portion 30 of the dividing wall 18 has an axial length "a" which is slightly larger than the thickness of the sheet steel. In the large-diameter annular disc portion 36, a concave groove 36-1 is formed on a whole circumference of the outer peripheral surface for the seal ring receiving.

Next, assembly of the dividing wall 18 in the primary pulley 12 will be described with reference to FIG. 1. In a central bore 30-1 of the central cylinder portion 30 (in FIG. 2), the dividing wall 18 is fittingly inserted to an abutment position of a shoulder portion 13-4 in a small-radius portion 13-3 which is existed in a tip of the rotational shaft 13. The central cylinder portion 30 is fastened between an inner race 24-1 of a roller bearing 24 and the shoulder portion 13-4 by a fastening nut 42, and the dividing wall 18 is fixed to the rotational shaft 13 and integrally rotates with the rotational shaft 13. In such a state, an end surface 32-1 of the small-diameter annular disc portion 32 which is abutted to (is contacted with) an end surface 30-2 of the movable sheave side of the central cylinder portion 30 in the dividing wall 18 is protruded from an outer peripheral surface of the rotational shaft 13. The end surface 32-1 of the small-diameter annular disc portion 32 functions as an abutment portion of the present invention that defines a most extension position of the movable sheave 16. That is, in a state that the movable sheave 16 is a most extension position, an end surface 16-2A of the central cylinder extending portion 16-2 of the movable sheave 16 is abutted to the end surface 32-1 of the small-diameter annular disc portion 32 of the dividing wall 18. A seal ring 44 is installed to a groove 36-1 of the outer peripheral surface of the large-diameter annular disc portion 36 of the dividing wall 18. The large-diameter annular disc portion 36 of the dividing wall 18 is fittingly inserted to the outer peripheral cylinder extending portion 16-3 of the movable sheave 16. The seal ring 44 maintains the oil-tightness to an opposite surface of the outer cylinder extending portion 16-3 of the movable sheave 16. That is, the seal ring 44 ensures the oil-tightness of the oil pressure chamber 20 and enables to relatively move the movable sheave 16 to the dividing wall 18.

Next, the cross-sectional shape of the inner peripheral concave surface 40 of the bent portion 38 in the small-diameter annular disc portion 32 will be described with reference to FIG. 3A. The inner peripheral concave surface 40 is constituted by an inner radius side arc 40-1 whose origin position is $O_1$ and curvature radius is $R_1$, an outer radius side arc 40-2 whose origin position is $O_2$, which is a different position from the origin position $O_1$ of the inner radius side arc 40-1 (the position of $O_2$ is slightly shifted from the position $O_1$ to the movable sheave side and the central shaft side), and curvature radius is $R_2$, which is a different value from the curvature radius $R_1$ of the inner radius side arc 40-1, and an intermediate portion 40-3 that the inner radius side arc 40-1 is smoothly connected to the outer radius side arc 40-2. The inner radius side arc 40-1 in the concave surface 40 comprises a relief which is slightly retreated from the end surface 32-1 (a retreat amount=δ), and the outer radius side arc 40-2 is straightly connected to the inner peripheral surface 34-1 of the intermediate body portion 34. At the intermediate portion 40-3 in the concave surface 40, the inner radius side arc 40-1 is connected tangent to the outer radius side arc 40-2. That is, as shown in FIG. 3B, the intermediate portion 40-3 is on an arc $C_M$ whose central position is $O_M$. The arc $C_M$ is tangent to both the arc $C_1$ whose origin position is $O_1$ and the arc $C_2$ whose origin position is $O_2$. The relief δ is provided for abutting the central cylinder extending portion 16-2 of the moving movable sheave 16 to the end surface 32-1 of the small-diameter annular disc portion 32. Thereby, the most extension position of the movable sheave 16 can surely be defined.

Figure 3B:
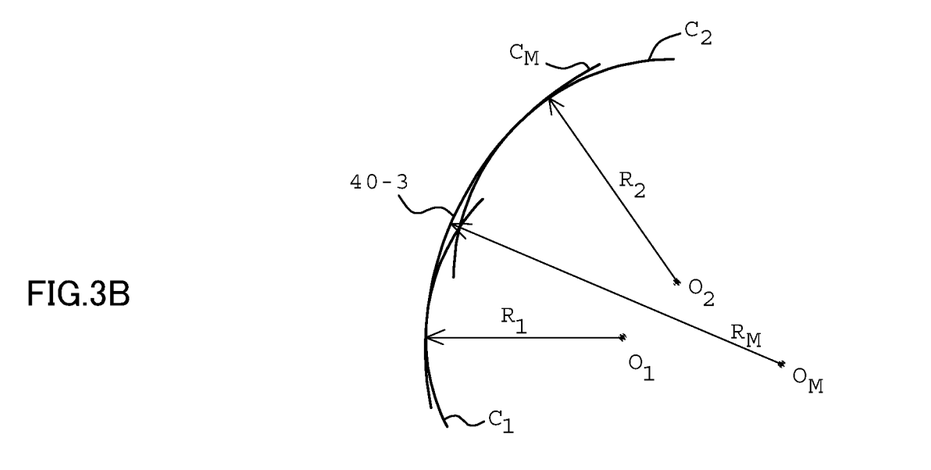
FIG. 3B is a detail explanation diagram showing a configuration of the inner peripheral concave surface.
Figure 4A:
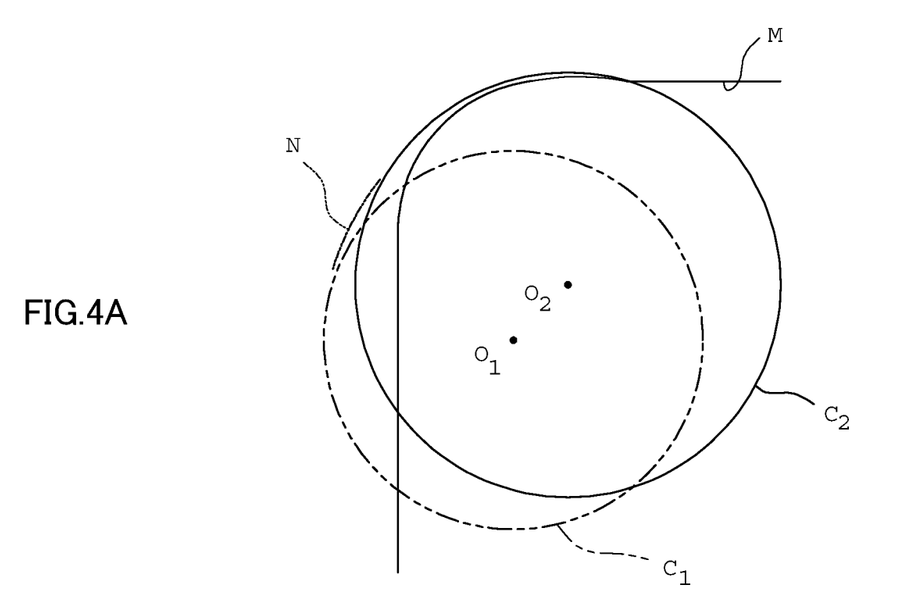
FIGS. 4A and 4B are diagrams showing a finish cutting machining process of the concave surface in FIGS. 3A and 3B.
Figure 4B:
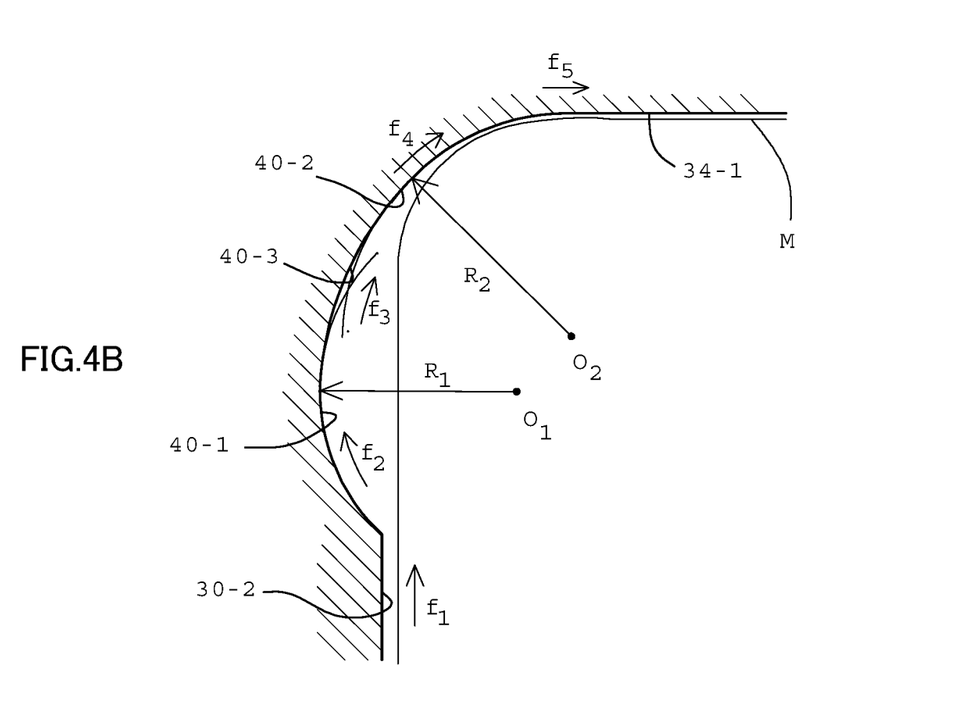

A process for forming the concave surface 40 of the present invention will be described. In FIG. 4A, an inner surface shape of the bent portion in a state that the concave surface 40 is unformed after performing the press working is shown by a solid line. Subsequently, the cutting process will be performed along the inner radius side arc 40-1 and the outer radius side arc 40-2. The origin positions of the inner radius side arc 40-1 and the outer radius side arc 40-2 which are shown by $O_1$ and $O_2$, respectively. The respective diameter circles are depicted by imaginary lines $C_1$ and $C_2$. A curved line that the diameter circle $C_1$ is smoothly connected to the diameter circle $C_2$ in a tangential direction with a slight concave is shown by "N". FIG. 4B shows a moving locus of the tip of the cutting tool for performing the cutting finish of the concave surface 40. The workpiece is installed to the lathe, and the center line of the workpiece (which is coincident with the central shaft "L" in FIG. 1) is held at the chuck center. At first, the cutting tool moves along an arrow $f_1$ in the radial direction, and the end surface 30-2 of the movable sheave side of the central cylinder portion 30 of the dividing wall 18 is cutting. Next, as shown in an arrow $f_2$, the cutting tool moves along the circular shape whose origin position is $O_1$ and radius is $R_1$, and the cutting of the inner radius side arc 40-1 in the concave surface 40 is performed. The moving locus of the cutting tool is transited to the curved line "N" that the diameter circle $C_1$ of FIG. 4A is smoothly connected to the diameter circle $C_2$ of FIG. 4A (the circle $C_1$ is connected tangent to the circle $C_2$, as described in FIG. 3B). The cutting tool moves along an arrow $f_3$, and the cutting of the intermediate portion 40-3 in the concave surface 40 shown in FIG. 3B is performed. After completing the cutting of the intermediate portion 40-3 in the concave surface 40, as shown by an arrow $f_4$, the moving locus of the tip of the cutting tool is transited to the circular shape whose origin position is $O_2$ and radius is $R_2$, the cutting of the outer radius side arc 40-2 in the concave surface 40 is performed. Lastly, the moving locus of the tip of the cutting tool is transited to an arrow $f_5$ along the line of the axial direction. A not-cutting portion of the workpiece is cut, and then this portion becomes the inner peripheral surface 34-1 of the intermediate body portion.

Figure 5A:
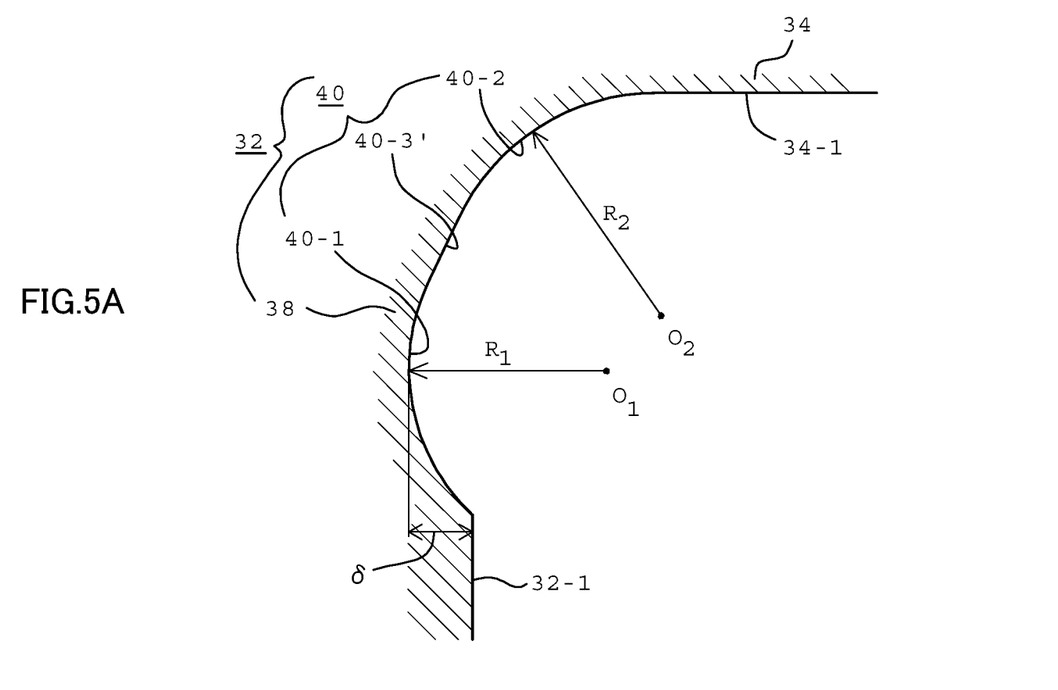
FIG. 5A is a diagram showing another embodiment using two arcs that one tangential line of one arc is connected to another tangential line of another arc.
Figure 5B:
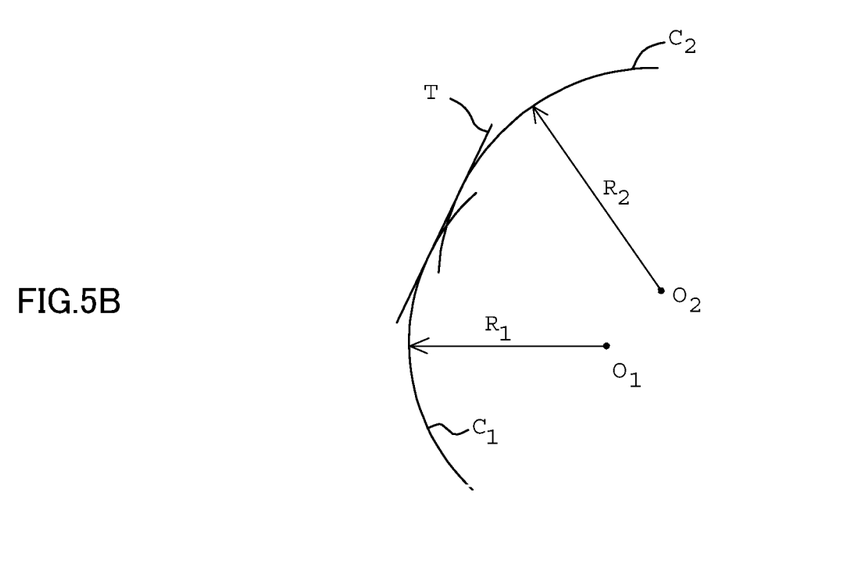
FIG. 5B is a detail explanation diagram showing a configuration of the inner peripheral concave surface.

The concave surface 40 of FIG. 5A is a modified example of FIG. 3. The intermediate portion 40-3' is a tangential line between the inner radius side arc 40-1 and the outer radius side arc 40-2. That is, as shown in FIG. 5B, the intermediate portion 40-3' is on the tangential line T between the arc $C_1$ whose origin position is $O_1$ and the arc $C_2$ whose origin position is $O_2$.

Figure 6:
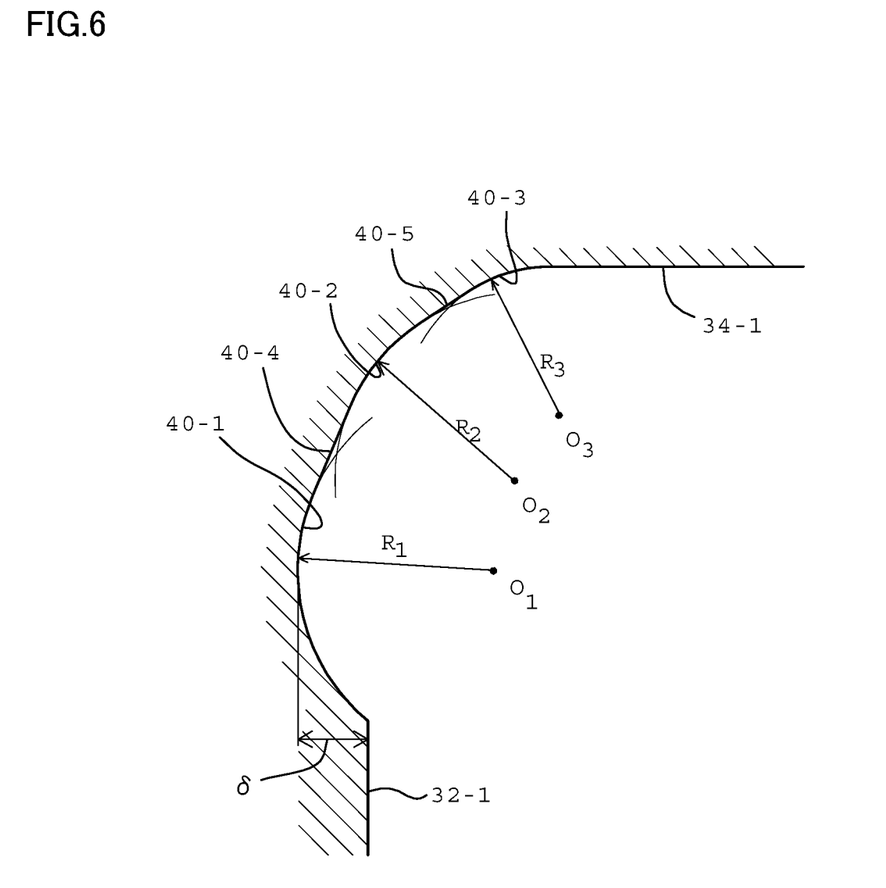
FIG. 6 is a diagram showing still another embodiment using three arcs that are connected tangent to the adjacent arc.

FIG. 6 is still another modified embodiment of the first embodiment. The cross-sectional shape of the inner peripheral concave surface 40 of the bent portion 38 in the small-diameter annular disc portion 32 is connected with three arcs. That is, the inner peripheral concave surface 40 is constituted by the inner radius side arc 40-1 whose origin position is $O_1$ and curvature radius is $R_1$, the intermediate side arc 40-2 whose origin position is $O_2$ and curvature radius is $R_2$, the outer radius side arc 40-3 whose origin position is $O_3$ and curvature radius is $R_3$, a first intermediate portion 40-4 which is connected with the inner radius side arc 40-1 and the intermediate side arc 40-2 by the tangential line, and a second intermediate portion 40-5 which is connected with the intermediate side arc 40-2 and the outer radius side arc 40-3 by the tangential line. In this embodiment, both of the first intermediate portion 40-4 and the second intermediate portion 40-5, or either of the first intermediate portion 40-4 or the second intermediate portion 40-5 can be the tangential arc which is described in FIG. 3B. In the above embodiment of FIG. 6, the number of the basic circles is three. A modified example that the number of the basic circles is more than three can be achieved.

Figure 3A:
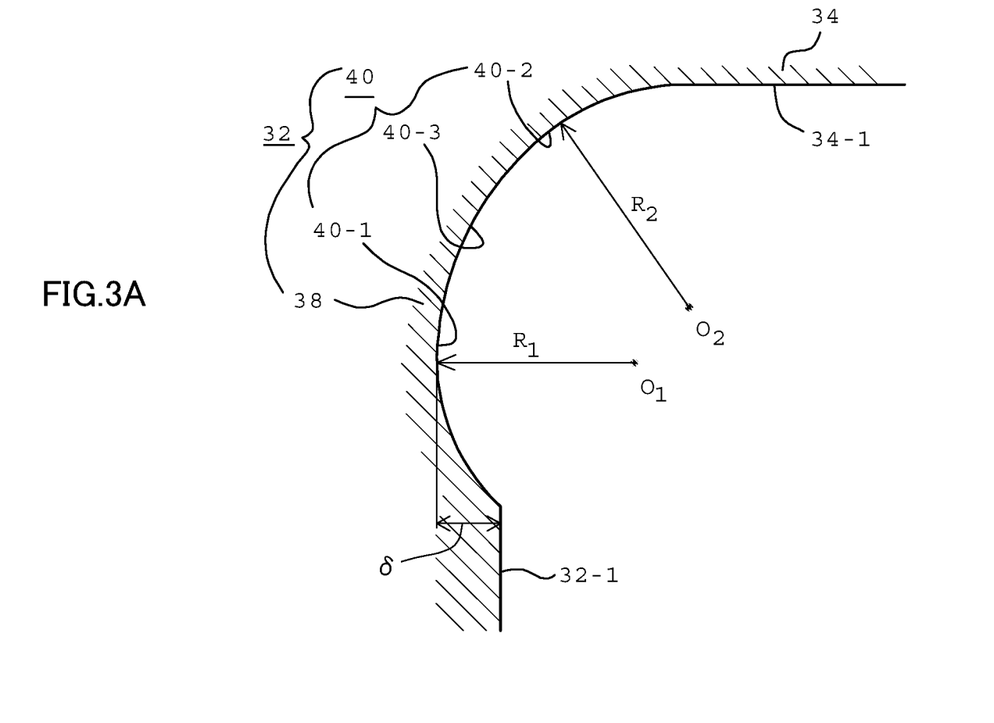
FIG. 3A is an enlarged cross-sectional view showing an inner peripheral surface of a bent portion in FIG. 2.
Figure 7:
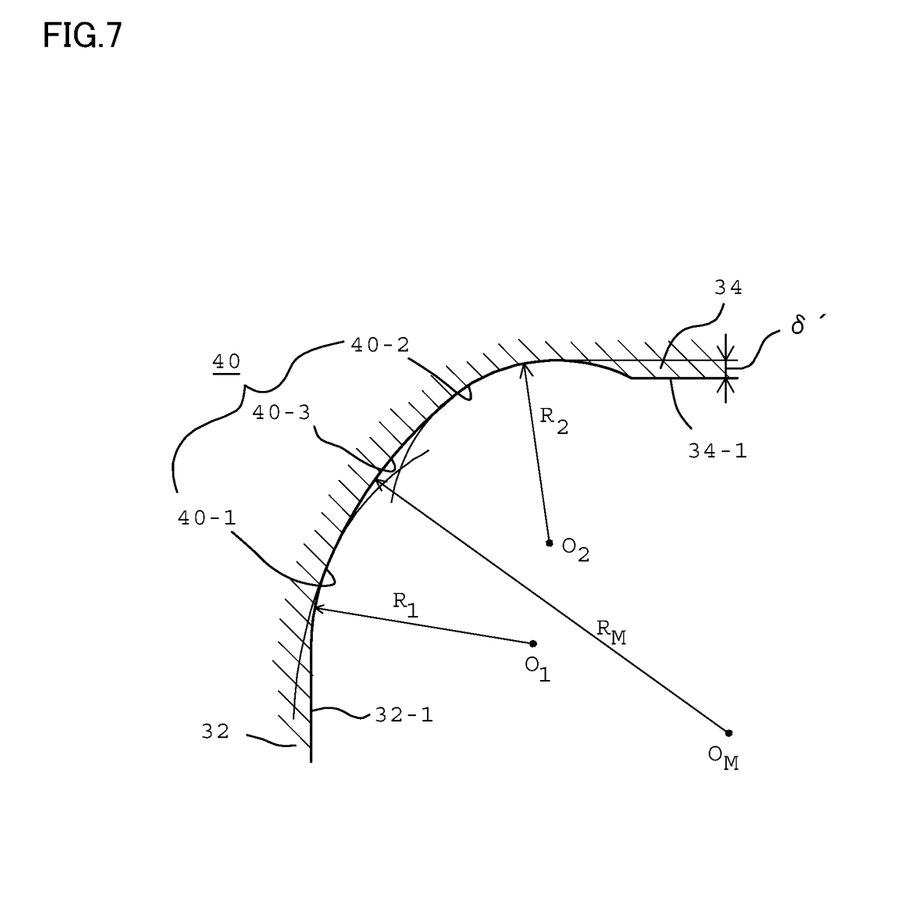
FIG. 7 is a diagram showing yet another embodiment that a relief is formed on the arc disposed at an outer radius side.
Figure 8:
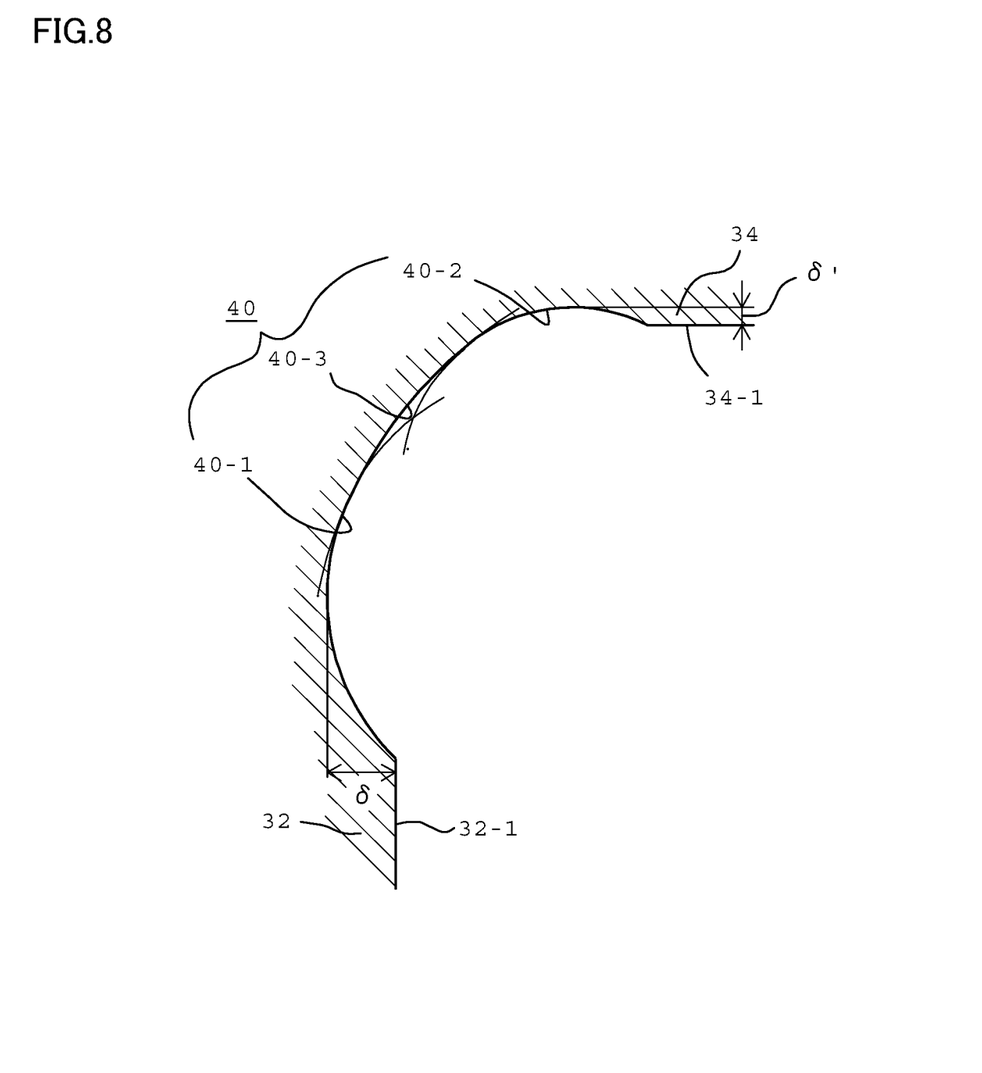
FIG. 8 is a diagram showing a further embodiment that reliefs are formed on both the arcs disposed at an inner radius side and at an outer radius side.

In the described embodiments of the present invention, as shown in FIG. 3A, the relief δ is formed in the end surface 32-1 side of the small-diameter annular disc portion 32. In a case that the movable sheave 16 is the most extension state, when the end surface 16-2A of the central cylinder extending portion 16-2 of the movable sheave 16 can be abutted to the end surface 32-1 and can be positioned to the end surface 32-1, it is possible that the relief δ is not disposed at the arc 40-1 side. That is, the relief can be formed at the inner peripheral surface 34-1 of the intermediate body portion 34. Yet another modified embodiment is shown in FIG. 7. As well as the first embodiment, in yet another embodiment, the inner peripheral concave surface 40 is constituted by the inner radius side arc 40-1 whose origin position is $O_1$ and curvature radius is $R_1$, the outer radius side arc 40-2 whose origin position is $O_2$ and curvature radius is $R_2$, and the intermediate portion 40-3 positioned on the circle whose origin position is $O_M$ and radius is $R_M$, and which is smoothly connected with the inner radius side arc 40-1 and the outer radius side arc 40-2. In the inner radius side arc 40-1, the inner peripheral surface side is extended to the end surface 32-1 of the small-diameter annular disc portion 32, and the relief is not formed at the small-diameter annular disc portion 32. On the contrary, the outer radius side arc 40-2 in the concave surface 40 forms the relief δ' to the inner peripheral surface 34-1 of the intermediate body portion 34 of the dividing wall 18. FIG. 8 shows further modified example. This further modified example is similar to the example of FIG. 7, and has a feature that the reliefs are formed at the inner radius side arc 40-1 and the outer radius side arc 40-2 in the inner peripheral concave surface 40. That is, the inner peripheral surface side of the inner radius side arc 40-1 forms the relief δ to the end surface 32-1 of the small-diameter annular disc portion 32, and the outer radius side arc 40-2 forms the relief δ' to the inner peripheral surface 34-1 of the intermediate body portion 34. As still further modified embodiment, it is exemplified that the relief is formed at neither the end surface 32-1 side nor the inner peripheral surface 34-1 side. In the cross-sections of this embodiment, if two concave surfaces which have a different curvature radius value are smoothly connected, this embodiment is included within the scope of the present invention.

EXAMPLE

Sheet steel in accordance with Japanese Industrial Standards (JIS) for an automotive structure having a 6.3 mm thickness is used as a raw material. The press working is performed to the above sheet steel, the cutting finish (including the concave surface cutting process in FIG. 4B) is also performed to the above sheet steel, and then the dividing wall 18 having following specifications (FIG. 2) is obtained. That is, a shaft length "a" of the central cylinder portion 30 is=10.2 [mm]; the value of "a second outer diameter×b" of the small-diameter annular disc portion 32 is 82.5 [mm]; the value of "the second outer diameter×c" of the large-diameter annular disc portion 36 is 161.5 [mm] and 162.5 [mm]; a total length "d" from the central cylinder portion 30 to the large-diameter annular disc portion 36 is 48.2 [mm]; a center bend radius of the bent portion 38 is 10 [mm] through 11 [mm]; and the curvature radii of the concave surface 40 $R_1$ and $R_2$ are 5 [mm] through 6 [mm] and 5 through 6.5 [mm], respectively. A load cell is stuck on the central portion of the concave surface 40, and simulated durability test is performed. In this durability test, the central cylinder portion 30 is held by a jig. When the 6 MPa pressure at 20 [Hz] is intermittently applied to the movable sheave 16 side surface of the dividing wall 18, the stress generated at the concave surface portion 40 is measured by the load cell. The measurement value is 564 [MPa].

COMPARATIVE EXAMPLE

The raw material and the dimensions of the respective portions of the dividing wall in a comparative example are the same as the Example except for the curvature radii of the concave surface 40. In the comparative example, the conventional single curvature radius value R (=2.0 [mm]) in the concave surface 40 is used. The pressure test under the same conditions as the Example is performed, and the stress generated at the concave surface portion 40 is measured. The measurement value by the load cell is 854 [MPa].

Figure 9:
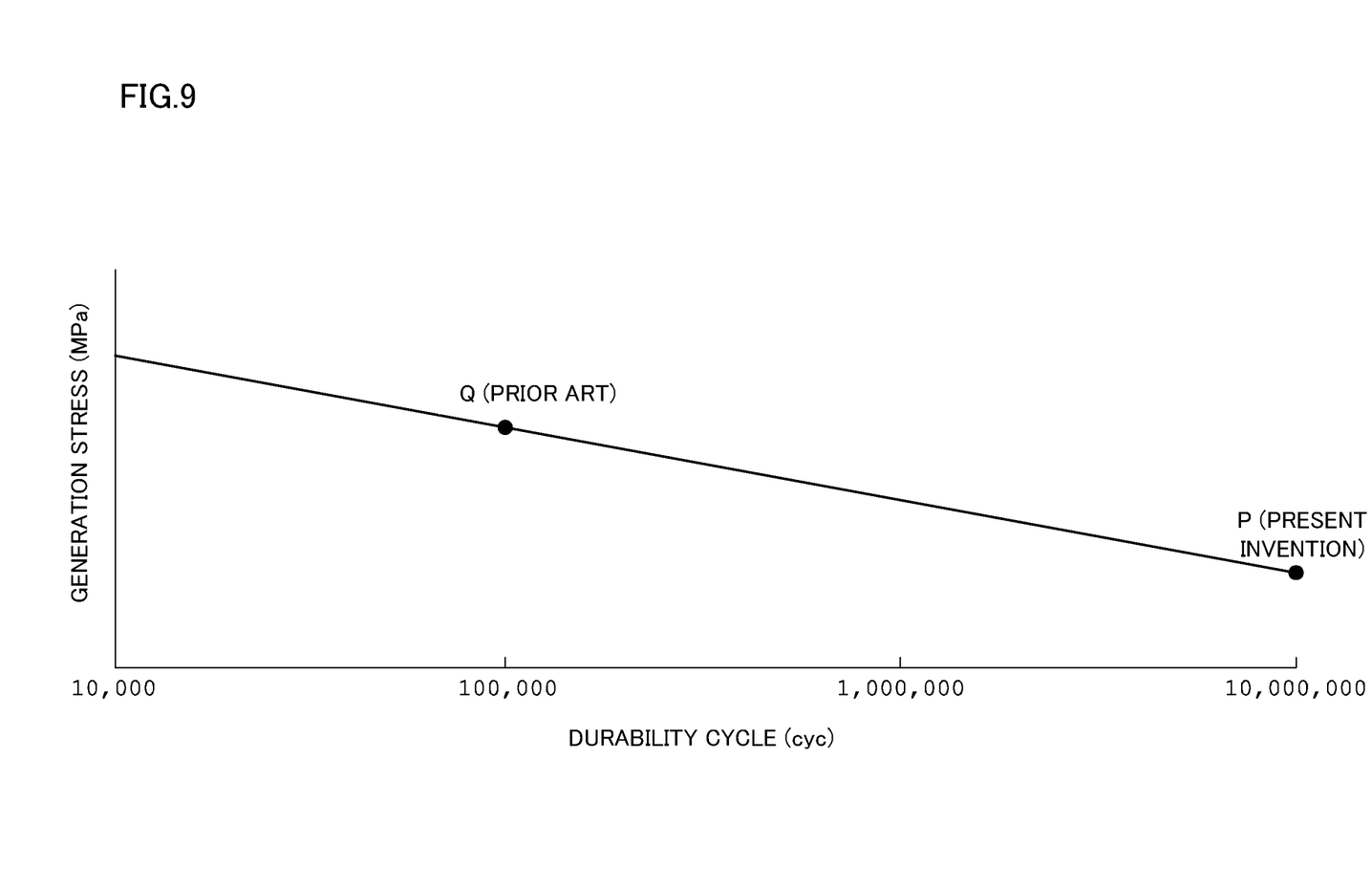
FIG. 9 is a graph showing a relationship between a repeated load cycles and generation stress on the concave surface when a crack in the dividing wall is generated in a case of using a finite element method.

FIG. 9 shows virtual repeated pressure test results of the dividing walls in the finite element method (FEM) that is performed by the inventors. A horizontal axis (a logarithmic scale) denotes a repeated pressing number (cyc) until the crack is generated. A vertical axis denotes a generation stress value in the inner peripheral side concave surface 40 of the bent portion 38 of the small-diameter annular disc portion 32 of the dividing wall 18. In a case that the stress value (564 [MPa]) in the Example of the present invention is used (P point in FIG. 9), it is understood that the dividing wall 18 can endure the repeated load whose repetition number is ten million. This value is complied with the requirement of the users. On the contrary, in a case that the stress value (854 [MPa]) in the Comparative Example is used, the durability cycle whose repetition number is one hundred thousand can only be obtained (Q point in FIG. 9). It is understood that the durability cycle (ten million times) that the users require can be obtained in the dividing wall according to the present invention without the soft nitriding treatment.

EXPLANATION OF REFERENCE NUMERALS

10 housing
12 primary pulley
13 rotational shaft
14 fixed sheave
16 movable sheave
18 dividing wall
20 hydraulic pressure chamber
26 belt groove having a V-shape cross-section
30 central cylinder portion of the dividing wall 18 (rotational shaft attachment portion in the present invention)
32 small-diameter annular disc portion of the dividing wall 18 (movable sheave abutment portion in the present invention)
34 intermediate body portion of the dividing wall 18 (axial direction extending portion in the present invention)
36 large-diameter annular disc portion of the dividing wall 18 (movable sheave slidable moving portion in the present invention)
38 bent portion of the small-diameter annular disc portion of the dividing wall 18
40 inner peripheral concave surface of the bent portion 38 of the dividing wall 18
40-1 inner radius side arc of the inner peripheral concave surface 40 of the bent portion 38 of the dividing wall 18
40-2 outer radius side arc of the inner peripheral concave surface 40 of the bent portion 38 of the dividing wall 18
40-3 intermediate portion of the inner peripheral concave surface 40 of the bent portion 38 of the dividing wall 18

The invention claimed is:

1. A dividing wall for a primary pulley in a belt-type continuously variable transmission that comprises a rotational shaft, a fixed sheave to integrally rotate said rotational shaft, a movable sheave to integrally rotate said rotational shaft, move to said fixed sheave in a shaft direction and vary a distance to said fixed sheave depending on hydraulic pressure, a hydraulic pressure chamber formed to an spacing side of said fixed sheave in said movable sheave, and a dividing wall that has a tubular cylindrical shape as a whole for forming said hydraulic pressure chamber, integrally rotates said rotational shaft, maintains oil-tightness to said movable sheave and slidably moves in said shaft direction,
    wherein said dividing wall is manufactured by press-molding to a steel sheet having a predetermined thickness and performing a finish cutting machining process, and comprises:
    a rotational shaft attachment portion to attach to said rotational shaft;
    a movable sheave abutment portion to slightly and outwardly extend in a radial direction to said rotational shaft attachment portion and form an opposite abutment surface to said movable sheave;
    an extending portion to extend from said movable sheave abutment portion to said shaft direction so that said movable sheave moves to said fixed sheave in said shaft direction; and
    a movable sheave slidable moving portion to maintain oil-tightness to said movable sheave at said proximal end of said movable sheave of said extending portion, slidably move in said shaft direction, and engage with said movable sheave,
    wherein said movable sheave abutment portion comprises a bent portion to be bent for and be connected to said extending portion, and
    wherein a cross-section of an inner peripheral concave surface of said bent portion comprises:
    at least two arcs that have a different origin position and a different curvature radius, and
    at least one connection portion where said at least two arcs are smoothly connected.

2. The dividing wall according to claim 1,
    wherein said connection portion is a tangential line or a tangential arc so as to smoothly connect to said at least two arcs.

3. The dividing wall according to claim 1,
    wherein an innermost diameter side arc in said at least two arcs forms a relief surface in said shaft direction, an outermost diameter side arc in said at least two arcs forms a relief surface in said radial direction, or an innermost diameter side arc forms a relief arc in said shaft direction and an outermost diameter side arc forms a relief arc in said radial direction.

4. The dividing wall according to claim 1, wherein a soft nitriding treatment is not performed to said dividing wall after forming said inner peripheral concave surface of said bent portion by cutting.

5. The dividing wall according to claim 2, wherein a soft nitriding treatment is not performed to said dividing wall after forming said inner peripheral concave surface of said bent portion by cutting.

6. The dividing wall according to claim 3, wherein a soft nitriding treatment is not performed to said dividing wall after forming said inner peripheral concave surface of said bent portion by cutting.

7. The dividing wall according to claim 4, wherein a soft nitriding treatment is not performed to said dividing wall after forming said inner peripheral concave surface of said bent portion by cutting.

8. The dividing wall according to claim 2, wherein an innermost diameter side arc in said at least two arcs forms a relief surface in said shaft direction, an outermost diameter side arc in said at least two arcs forms a relief surface in said radial direction, or an innermost diameter side arc forms a relief arc in said shaft direction and an outermost diameter side arc forms a relief arc in said radial direction.

* * * * *